United States Patent
Marsetti

(10) Patent No.: US 6,634,826 B1
(45) Date of Patent: Oct. 21, 2003

(54) CLAMP FOR SUPPORT AND CONNECTION MEMBERS

(75) Inventor: Sergio Marsetti, Castelli Calepio (IT)

(73) Assignee: System Plast S.p.A., Telgate (IT)

( * ) Notice: Subject to any disclaimer, the term of this patent is extended or adjusted under 35 U.S.C. 154(b) by 0 days.

(21) Appl. No.: 09/516,037

(22) Filed: Mar. 1, 2000

(30) Foreign Application Priority Data

Jun. 17, 1999 (IT) ........................................ MI990397 U

(51) Int. Cl.[7] .............................................. B65G 21/20
(52) U.S. Cl. .................... 403/325; 403/326; 24/658; 24/115 G; 248/354.4
(58) Field of Search ................................. 403/349, 348, 403/400, 325, 324, 109.6, 326; 248/354.4; 24/658, 115 G

(56) References Cited

U.S. PATENT DOCUMENTS

| | | | | |
|---|---|---|---|---|
| 942,780 A | * | 12/1909 | Iversen .................... | 403/324 |
| 1,204,457 A | * | 11/1916 | Kreeft ..................... | 24/115 G |
| 3,080,867 A | * | 3/1963 | Eichinger ................ | 24/115 G |
| 3,103,352 A | * | 9/1963 | Steffen ................... | 403/389 X |
| 3,806,860 A | * | 4/1974 | Flammini ................. | 439/817 |
| 4,354,410 A | * | 10/1982 | Stubbings ............... | 83/471.3 |
| 4,726,615 A | * | 2/1988 | Goldberg ............... | 403/325 X |
| 4,884,914 A | * | 12/1989 | Shultz .................... | 403/118 |
| 5,078,310 A | * | 1/1992 | Ferry ..................... | 24/115 G |
| 5,186,197 A | * | 2/1993 | Lavine ................... | 403/349 X |
| 5,323,514 A | * | 6/1994 | Masuda et al. ......... | 24/115 G |
| 5,335,782 A | | 8/1994 | Herzog ................... | 198/836.3 |
| 5,501,544 A | * | 3/1996 | Cairns .................... | 403/400 |
| 6,003,662 A | * | 12/1999 | McCaffrey et al. ..... | 198/836.3 |
| 6,126,359 A | * | 10/2000 | Dittrich et al. .......... | 403/349 |
| 6,260,245 B1 | * | 7/2001 | Marsetti ................. | 403/326 X |

FOREIGN PATENT DOCUMENTS

| | | | |
|---|---|---|---|
| CA | 2211915 | | 8/1997 |
| CA | 2269107 A | * | 10/1999 |
| DE | 4242119 | | 6/1994 |
| GB | 1597992 | | 9/1981 |
| WO | 9818697 | | 7/1998 |

* cited by examiner

*Primary Examiner*—Lynne H. Browne
*Assistant Examiner*—Ernesto Garcia
(74) *Attorney, Agent, or Firm*—Steinberg & Raskin, P.C.

(57) ABSTRACT

A clamp for locking at least one pin (30) or the like, comprising a hollow body (1) provided with coaxial apertures (9) and in which there is mounted, slidable but not rotatable, a member (11) loaded by a spring (10) and provided with a through hole (12) able to align with said coaxial apertures (9) for passage of said pin (30), and connected axially but not rotatably to an operating knob (18) able to assume and maintain two positions, namely one in which the pin (30) is released by moving said member against the action of the spring (10) and one in which the pin is locked by the action of the spring.

7 Claims, 2 Drawing Sheets

CLAMP FOR SUPPORT AND CONNECTION MEMBERS

FIELD OF THE INVENTION

This invention relates to a clamp for support and connection members such as pins and the like, particularly but not exclusively as used in conveyor belts for supporting the relative guides, for example lateral guides.

BACKGROUND OF THE INVENTION

With particular but not exclusive reference to conveyor belts, these are known to comprise later al guides formed for example from longitudinal section bars, which are supported by pins mounted in clamps. With these known clamps, the pins are clamped by screw means and can be adjusted by slackening and tightening these latter.

The operations involved in slackening and tightening these screw means in order to position the lateral guides in the desired manner are relatively burdonsome in terms both of time taken and force required, especially considering that in a conveyor belt complex of one and the same production plant there can be some hundreds if not thousands of such clamps.

OBJECTS AND SUMMARY OF THE INVENTION

The main object of the invention is therefore to provide a clamp which eliminates the need to use screw means for locking the clamped piece or component (such as a pin) by using for its tightening the action of elastic means and for its slackening a manual action counteracting that of said elastic means.

Another object of the invention is to provide a clamp in which its tightening is achieved by the action of elastic means and its slackening by a manual counteraction which locks the clamp in the slackened position (in which the required adjustment can be made), from which tightening can be again achieved by releasing the clamp from this position.

A further object of the invention is to provide a clamp in which it is easier and quicker to position the clamped piece or pin and adjust the length of that portion thereof which projects from the clamp.

As there exists, not only in the conveyor belt sector, the need for a cross-type clamp, ie a clamp which clamps two separate members positioned at a right angle, a further object of the invention is to provide a cross-type clamp in which the tightening and slackening procedures of the two preceding objects apply to at least one of these members.

These and further objects which will be more apparent from the ensuing detailed description are attained by a clamp in accordance with the teachings of the accompanying claims.

DETAILED DESCRIPTION OF THE INVENTION

Figure 1:
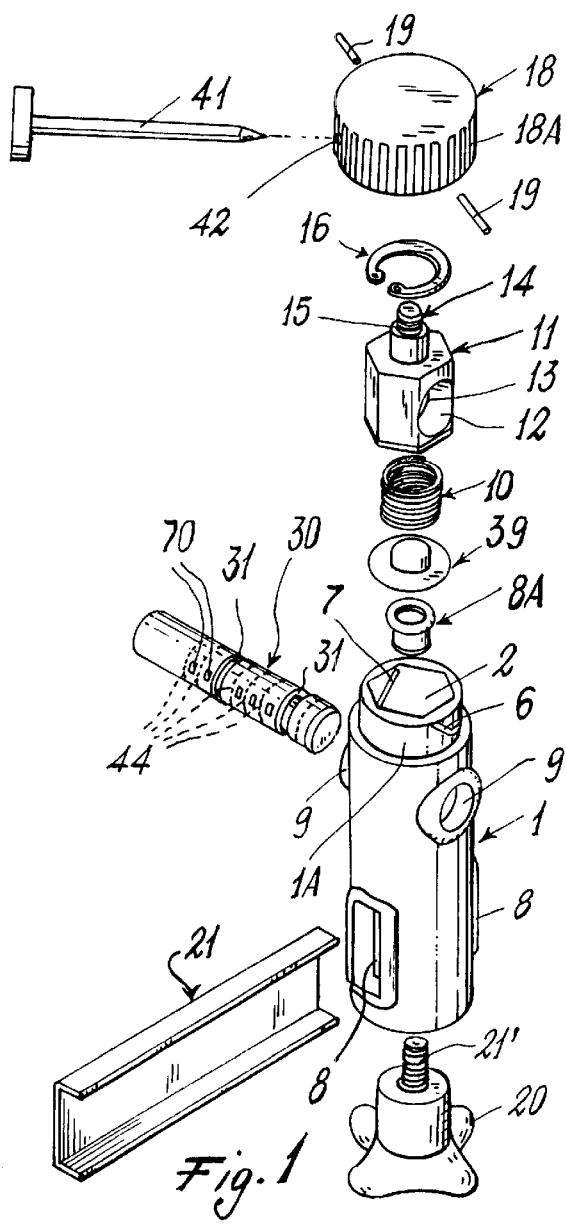
FIG. 1 is a perspective view of a first embodiment of a clamp of the invention.
Figure 2:
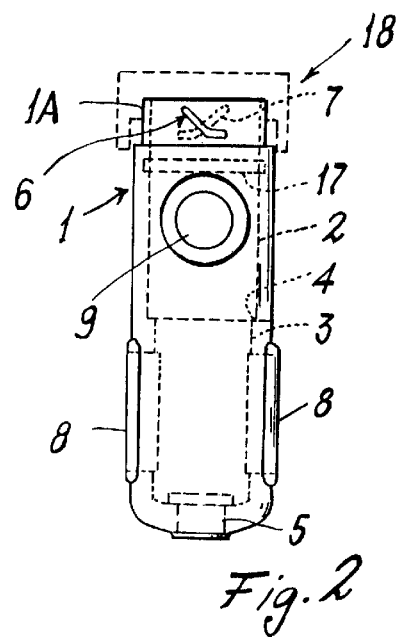
FIG. 2 is a side view of the body of the clamp of FIG. 1.
Figure 3:
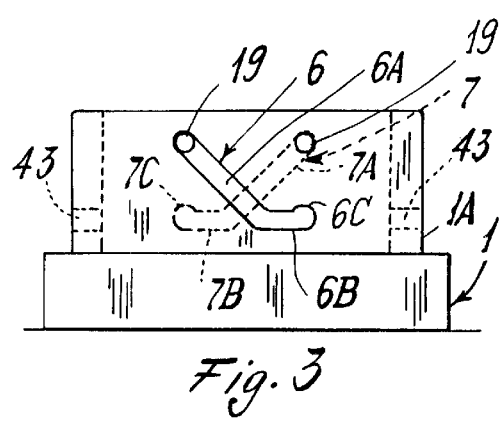
FIG. 3 is an enlarged side view of the upper part of FIG. 2.

With reference to FIGS. 1 to 4, the clamp of the illustrated embodiment comprises an approximately cylindrical outer body 1 constructed of a known plastic, for example an engineering polymer. The body has an axial bore which in its upper portion 2 (on the drawing) has a polygonal cross-section, for example hexagonal. This upper portion is followed by a substantially circular lower portion 3 (on the drawing) of diameter such that the two portions 2 and 3 meet at a step 4. The lower portion 3 has a terminal part 5 also of circular section but of reduced diameter.

The outer body 1 has an upper extension 1A of lesser outer diameter than the remaining part.

In diametrically opposite positions of the extension 1A there are provided equal but opposite guide apertures 6 and 7 defined by a descending rectilinear portion 6A, 7A, and a portion 6B, 7B with its longitudinal axis lying in a plane perpendicular to the longitudinal axis of the body 1, the portion 6B, 7B terminating with a recess 6C, 7C directed upwards (on the drawing).

The body 1 also comprises two diametrically opposing coaxial equal rectangular apertures 8 and two axially spaced-apart equal coaxial circular holes, their common axis lying at 90° to the common axis of said rectangular apertures.

The terms "apertures" and "bores" are used interchangeably herein. It is to be understood that the term "coaxially bore" and "coaxially aperture" when used herein refers to the apertures/bores 8 and 9 in the drawings.

Figure 4:
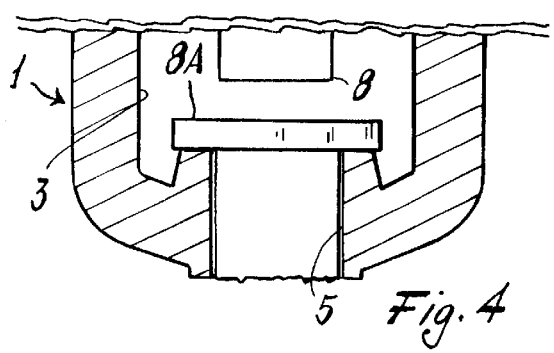
FIG. 4 is an enlarged section through the lower part of the body of FIG. 2.

The body 1 houses:
a) an internally threaded and externally knurled bush 8A which as shown in FIG. 4 is forced into the terminal part 5;
b) a washer 39, preferably upwardly (with reference to FIG. 1) convex which rests on the step 4 and serves as a support for
c) a compression spring 10, the other end of which bears on
d) a member 11 having a transverse circular through hole 12 (preferably comprising at its mid length an annular projection 13) and, at the opposite end to that on which the spring bears, an appendix 14 provided with one or more annular projections 15, the member 11 having a polygonal cross-section which mates with that of the upper portion 2 of the bore through the body 1 so as to be able to slide therein but not rotate;
e) a snap ring 16, which is inserted into an inner annular groove 17 in the body 1 to retain the aforesaid internal parts (9 to 11) with in the body.

On the appendix 14 of the member 11 there is snap-fitted in known manner a knob 18 in such a manner that it can rotate about said member 11 but cannot move axially on it.

Transversely to and radially within the knob 18, which is of engineering polymer, there are positioned two mutually coaxial metal pegs 19 located to penetrate respectively into the profiled guide apertures 6 and 7 provided in the extension 1A of the body 1. These pegs are shown outside the knob 18 in FIG. 1.

With the threaded bush 8A there cooperates a knob 20 with screw 21 for tightening a section bar 21 positioned through the rectangular apertures 8. On rotating the knob in one direction, the end of the screw 21 is forced against the section bar to lock it against the upper (with reference to the drawing) edge of the apertures 8. On rotating the knob in the other direction the section bar is released.

When the other knob, ie the knob 18, is rotated manually from the position in which the relative pegs 19 lie at the upper end of the portions 6A, 7A of the guides 6, 7 to the position in which they lie within the recesses 6C, 7C, there is firstly a downward (with reference to the drawing) movement both of the knob 18 and of the member 11 against the action of the spring 10, then along the portion 6B and 7B the knob alone rotates, and finally there is a slight upward (with reference to the drawing) movement of the knob 18 and member 11 because of the entry of the pegs 19 into the recesses 6C and 7C. Both at the end of the downward movement and at the end of the small rise due to the recesses 6C, 7C there is virtual coaxiality between the holes 9 and the through hole 12 of the member 11, so that a pin 30 can be removed or be moved into the desired position, in which one of its grooves 31 is made to coincide with the annular projection 13 in the member 11. On rotating the knob in the reverse direction, ie such that the relative pegs 19 move from the recesses 6C, 7C to the upper (with reference to the drawing) ends 6A, 7A of the guide apertures 6, 7. the member 11 moves upwards (with reference to the drawing) under the action of the spring 10, with the result that the through hole loses its coaxiality with the holes 9 of the body 1, the projection 13 in the member 11 penetrates into the desired groove (31) of the pin 30, and this latter is locked in position.

Two things are evident. Firstly, the size of the through hole 12 at the relative annular projection 13 must be such as to enable the pin 30 to pass when the through hole 12 is substantially coaxial with the holes 9 of the body 1 and, when in the locked (ie non-coaxial) state, enable the annular projection 11 to enter the groove 31 in the pin 30 and this latter to lock against the upper (with reference to the drawing) edges of the holes 9. Secondly, on assembly, the member 11 must be mounted in the body 1 such that the relative through hole 12 lies on the same side as the holes 9 of the body 1.

Figure 5:
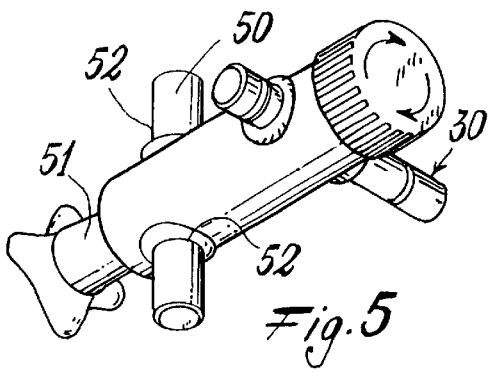
FIG. 5 is a perspective view of a second embodiment of the clamp according to the invention.

In the embodiment of FIG. 5, a circular rod 50 is to be clamped by the screw knob 51 instead of the section bar of FIG. 1.

In this case circular apertures 52 are provided instead of the rectangular apertures 8.

The scope of the invention also includes a clamp which excludes those parts used to clamp the section bar 21 and the rod 50, and hence limited to those parts relative to clamping the pin 30 and to maintaining it in its released position (for adjustment purposes).

The scope of the invention also includes an embodiment in which for clamping and releasing (and maintaining the released position of) a section bar or a rod 50, those parts provided for this purpose for the pin 30 and already described in detail are used.

Figure 6:
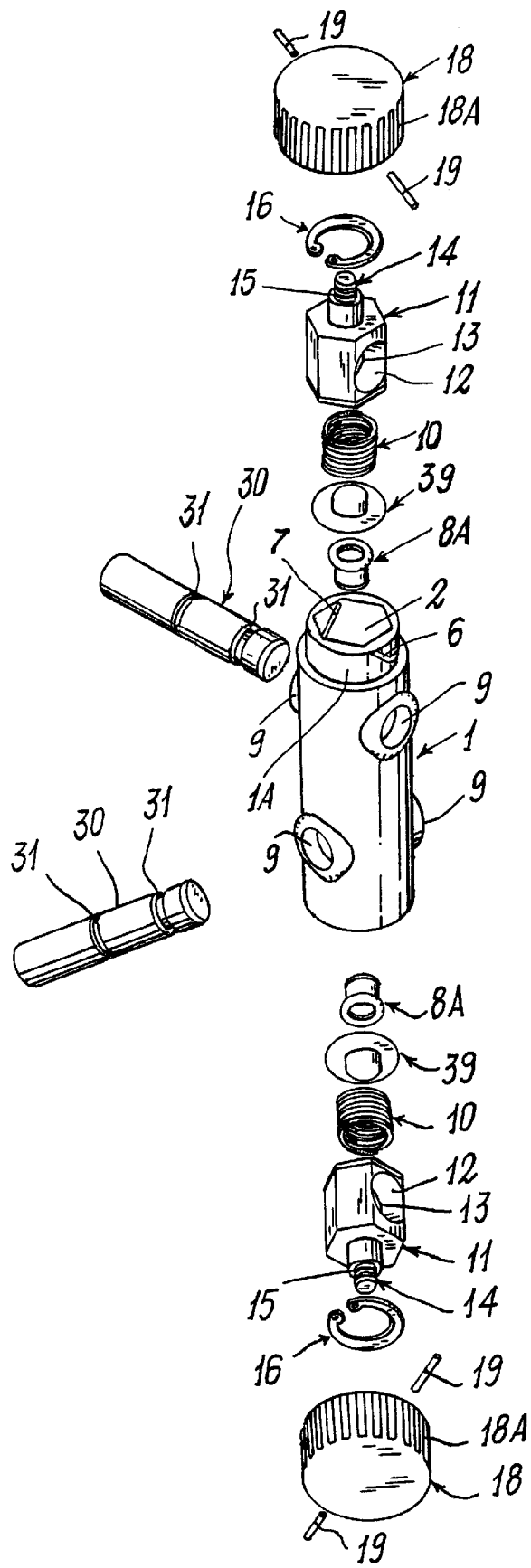
FIG. 6 is a perspective view of a third embodiment of the clamp according to the invention.

FIG. 6 shows a third embodiment of the clamp according to the invention which includes a hollow body (1) of the clamp assembly includes an additional coaxial bore (9) and an additional spring (10) arranged within the hollow body (1). FIG. 6 also reveals that an additional slidable but not rotatable member (11) is mounted in the hollow body (1), and is loaded by the additional spring (10), the additional member (11) having a through hole (12) aligning with the bore (9) formed in the hollow body (1). The through hole (12) is receives at least one pin such that the pin is insertable through the additional member (11) and the hollow body (1).

FIG. 6 also shows an additional knob (18) connected to the member (11). The knob (18) has a first position in which the knob (18) is moved against action of the additional spring (10) such that the pin is released and a second position in which the additional knob (18) is locked by the action of the additional spring (10) such that the pin is locked.

The scope of the invention also includes different means for locking the knob 18 in the position which enables the pin 30 to be moved than those already described. These locking means could for example comprise a peg 41 (FIG. 1) to be inserted into through holes 42, 43 (FIGS. 1 and 3) provided in the lateral wall 18A of the knob 18 and of the extension 1A of the body 1. These through holes 42, 43 are provided such that when the knob is in the position which enables the pin 30 to move, they are mutually coaxial, so enabling the peg 41 to be inserted to lock the knob.

Advantageously, the pin 30 comprises along its body a plurality of preferably recessed equidistant reference lines 44 (shown dashed in FIG. 1). These reference lines simplify and facilitate the operations required to adjust the length of that pin portion projecting from the clamp. In this respect, when a conveyor belt has to handle products, such as bottles, of different dimensions from the previously handled products, the position of all the pins has to be adjusted. The presence of the reference lines on the pin considerably facilitates this operation. Advantageously, the lines are made distinguishable from each other by marking each with a different recognition sign 70 such as, a different number or a different colour.

What is claimed is:

1. A clamp for locking at least one pin (30) comprising:
   a hollow body (1) provided with coaxial apertures (9);
   a slidable but not rotatable member (11) mounted in said hollow body (1), said slidable but not rotatable member (11) loaded by a spring (10) and provided with a through hole (12) able to align with said coaxial apertures (9) for passage of said pin (30), and
   an operating knob (18) operably coupled to said slidable but not rotatable member (11), said operating knob (18) being able to assume and maintain two positions, namely one in which the pin (30) is released by moving said member against the action of the spring (10) and one in which the pin is locked by the action of the spring;
   wherein the two positions of the knob (18) are achieved by cooperation between parts (19) associated with said knob (18) and guides (6, 7) provided within said body (1); and
   wherein the parts (19) are represented by coaxial pegs mounted in the knob (18) and penetrating said guides (6, 7) provided within said body (1).

2. A clamp assembly, comprising:
   a substantially cylindrical hollow body having a coaxial bore;
   a first pin, said coaxial bore structured and arranged for receiving the pin;
   a spring arranged within said hollow body,
   a slidable but not rotatable member mounted within said hollow body being loaded by said spring, said member having a through hole aligning with the bore formed in said hollow body, said through hole being structured and arranged for receiving said at least one pin such that the pin is insertable through said member and said hollow body, and
   a knob connected to said member, said knob having a first position in which said knob is moved against action of said spring such that the pin is released and a second position in which the knob is locked by the action of the spring such that the pin is locked.

3. A clamp assembly as claimed in claim 2, wherein said hollow body further comprises:

an additional coaxial bore, an additional spring arranged within said hollow body;

an additional slidable but not rotatable member mounted in said hollow body being loaded by said additional spring, said additional member having a through hole aligning with the additional bore formed in said hollow body, said through hole being structured and arranged for receiving a second pin such that the pin is insertable through said additional member and said hollow body, and an additional knob connected to said member, said knob having a first position in which said knob is moved against action of said additional spring such that the second pin is released and a second position in which the additional knob is locked by the action of the additional spring such that the second pin is locked.

4. A clamp assembly as claimed in claim 2, wherein said hollow body further comprises an additional coaxial bore displaced through 90° relative to said coaxial bore structured and arranged for receiving said pin, said additional coaxial bore being structured and arranged to receive a section bar; and a screw knob operably coupled to said hollow body for locking said section bar in said additional coaxial bore.

5. A clamp assembly as claimed in claim 2, wherein the pin has a plurality of reference lines.

6. A clamp assembly as claimed in claim 2, wherein said reference lines are equidistant.

7. A clamp assembly as claimed in claim 2, wherein the reference lines each have a recognition sign thereby distinguishable from each other.

* * * * *